T. W. ROSS.
DENTAL POST EXTRACTOR.
APPLICATION FILED DEC. 11, 1911.
1,035,744.
Patented Aug. 13, 1912.
Fig. I.
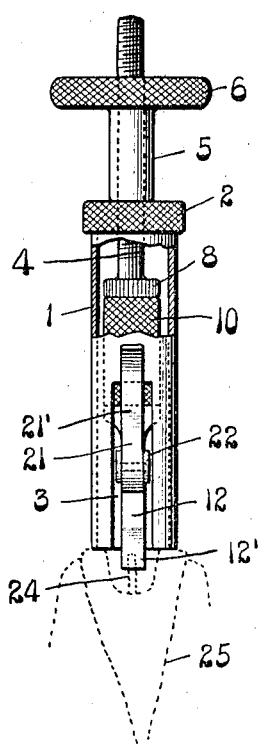
Fig. II.
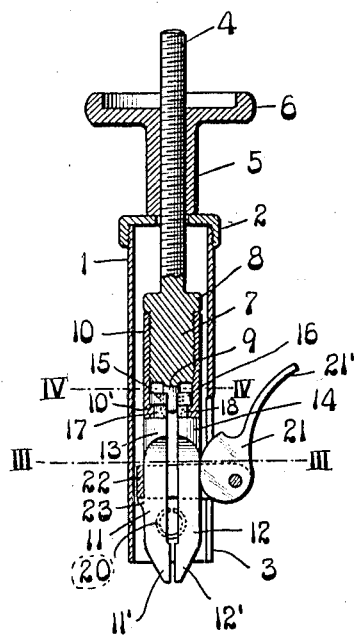
Fig. IV.
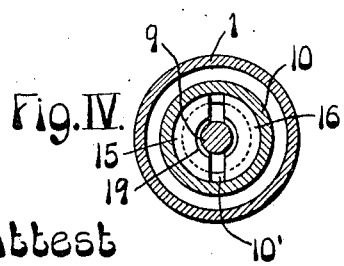
Fig. V.
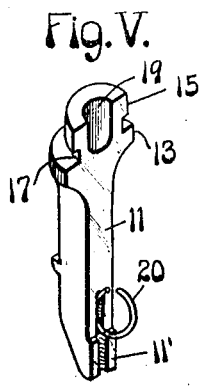
Fig. III.
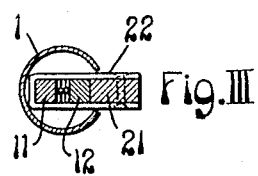
Attest
A. J. McCauley
E. B. [illegible]
Inventor:
Thomas W. Ross
by Knight & Cook
Attys.

UNITED STATES PATENT OFFICE.

THOMAS W. ROSS, OF ST. LOUIS, MISSOURI.

DENTAL POST-EXTRACTOR.

1,035,744.  Specification of Letters Patent.  Patented Aug. 13, 1912.

Application filed December 11, 1911. Serial No. 665,039.

*To all whom it may concern:*

Be it known that I, THOMAS W. ROSS, a citizen of the United States of America, and a resident of the city of St. Louis and State of Missouri, have invented certain new and useful Improvements in Dental Post-Extractors, of which the following is a full, clear, and exact description, reference being had to the accompanying drawing, forming part of this specification.

My invention relates to an improvement in dental post extractors, and has for its object to provide a simple, compact and efficient means for removing from the root of a tooth from which the crown has broken off the anchor post left therein, so that a new post may be inserted for the new crown to be mounted on the root of the tooth.

Another object of my invention is to provide a device of this character so that each of its several parts is made detachable and replaceable, so that if one of the parts should break it may be replaced at a fraction of the cost of the complete device, as well as to provide for the interchangeable use of gripping jaws having differently shaped gripping beaks.

Figure I is an enlarged side elevation of my invention, with part of the supporting sleeve broken away to show a section of the interior, mounted upon a tooth with an anchor post gripped between the beaks of the jaws; said tooth and post being shown in dotted outline. Fig. II is an enlarged longitudinal section of my invention. Fig. III is an enlarged detail view, partly in section taken on line III—III, Fig. II. Fig. IV is an enlarged detail view, partly in section, taken on line IV—IV, Fig. II. Fig. V is an enlarged perspective view of one of the gripping jaws and retracting spring.

In the accompanying drawings:—1 designates a supporting sleeve having at one of its ends a collar 2 threaded thereon, said collar being preferably provided with a milled gripping surface. The sleeve is provided with a longitudinal slot, as seen at 3, extending from substantially midway its length to the end opposite that upon which the collar 2 is mounted.

4 is a screw threaded post extending through a central perforation in the collar 2 and inwardly into the body of the sleeve. 5 is a nut provided with an enlarged milled portion 6, threaded upon said post above said collar, and of a diameter greater than the diameter of the central perforation in the collar 2 through which the post 4 passes. The post 4 terminates at its end within the supporting sleeve 1 in an enlarged screw threaded portion 7, having a milled shoulder 8.

9 is a spreader depending from and preferably integrally secured to the lower end of the enlarged portion 7.

10 designates an interiorly screw threaded collar adapted to be threaded upon the enlarged screw threaded portion 7 of the post 4, with its upper end abutting against the shoulder 8. This collar is provided with an inturned flange 10' at its lower end.

11 and 12 designate independent gripping jaws, each being provided near their upper or inner ends with shoulders 13 and 14. Tapered and serrated gripping beaks 11' and 12' are provided at the lower or outer end of each of said jaws.

15 and 16 are outwardly turned flanges at the upper or inner ends of the jaws 11 and 12, providing transverse grooves 17 and 18 between said flanges and the shoulders 13 and 14, in which grooves the flange 10' of the collar 10 is adapted to seat. The upper or inner ends of the gripping jaws are provided on their adjoining faces with longitudinal, downwardly tapering, slots, one of which is shown at 19, Fig. V. When the inner faces of these jaws are placed together, these slots are adapted to register to provide an aperture for the reception of the spreader 9 depending from the enlarged portion 7 of the post 4.

The gripping jaws 11 and 12 are detachably secured to the post 4, and abutting against the end of the enlarged portion 7, by being inserted into the perforation through the flanged end of the collar 10, it being understood that said collar is at this time detached from the enlarged screw threaded portion of the post 4. When the inner faces of these jaws are placed together, the diameter of the combined shoulders 13 and 14 is greater than the diameter of the opening 10' of the collar 10 to prevent the insertion of these gripping jaws into the opening in the flanged end of said collar beyond the upper surface of said shoulders. The collar 10, with the upper or inner ends of the gripping jaws inserted in its flanged end 10' is then threaded upon the enlarged portion 7 of the post 4 until the spreader 9 depending from this enlarged portion 7 is forced to enter, by this threading operation, the tapered aperture formed by the registration of the longitudinal slots 19 in the flanged ends of the gripping jaws 11 and 12, whereby said flanged ends are spread apart until the inturned flange 10' on the end of the collar 10 enters the grooves 17 and 18 above the shoulders 13 and 14 and beneath the flanges 15 and 16 on said gripping jaws, so that the bottom faces of said flanges rest upon the inner or upper face 10' of the collar 10. The jaws 11 and 12, by the mounting which I have described, are loosely interlocked with the post 4 so that, unless otherwise restrained, they would swing together at their lower or beak portions. To hold them in a retracted position, I provide a suitable spring, such for instance, as indicated at 20, Figs. II and V.

21 designates a cam having a cam lever 21', pivoted to a strap 22 surrounding the gripping jaws 11 and 12 at a point above the beaks 11' and 12'. This strap is restrained from downward movement by a boss 22 provided on the side of one of the gripping jaws. The cam 21 and outer ends of the strap 22 are adapted for longitudinal movement, accompanying the gripping jaws, in the slot 3 of the sleeve 1.

When it is desired to use my extractor, the proper adjustment upon the tooth root and anchor post is secured. The lever 21' is then moved upwardly to cause the cam to force the gripping jaws toward each other and the beaks into positive engagement with the anchor post. By reason of the pressure exerted and the frictional engagement with the edge of one of the gripping jaws, the cam holds said jaws in positive locked position. The nut 5 is then rotated, by gripping the milled portion 6, to withdraw the post 4 from the sleeve 1, which it does by reason of the fact that the inner end of the nut 5 bears against the outer surface of the collar 2. As the post and gripping jaws are moved upwardly through the operation referred to, the anchor post 24 in the root of the tooth 25, (see Fig. I), is withdrawn within the beaks 11' and 12'. When the anchor post is withdrawn from the root of the tooth, the cam lever 21' is moved downwardly, releasing the gripping jaws from the pressure exerted by the cam, when the spring 20 causes the beaks 11' and 12' to retract from each other, thus freeing the anchor posts from their grip. To again permit my extractor to be used, the nut 5 is rotated in a reverse direction to that previously described, which permits the post 4 and jaws 11 and 12 to move downwardly to any desired extent.

By the construction of the gripping jaws which I have provided, the operator is enabled to quickly substitute other gripping jaws, terminating in different shaped beaks, either more blunt or more pointed, as may be desired; or to replace gripping jaws, should the same become worn or broken.

I claim:—

1. A device of the character described, comprising a sleeve, a post operable in said sleeve, a pair of independent gripping jaws detachably interlocked with and carried by said post, means for advancing the lower or outer ends of said jaws into gripping engagement with a crown pin, and means for operating the post and jaws longitudinally of said sleeve.

2. A device of the character described, comprising a supporting member, a post carried by said supporting member, a pair of gripping jaws adapted to be interlocked with and carried by said post, a spreader between the upper or inner ends of said jaws to interlock them to said post, and means for advancing the lower or outer ends of said jaws into gripping engagement with a crown pin, and means for operating the post and jaws longitudinally of said supporting member.

3. A device of the character described, comprising a sleeve, a post operable in said sleeve, a pair of gripping jaws having longitudinally disposed slots in the upper or inner ends thereof, a spreader adapted to enter said slots in the upper or inner ends of said jaws to interlock said jaws to said post, means for advancing the lower or outer ends of said jaws into gripping engagement with a crown pin, and means for operating the post and jaws longitudinally of said sleeve.

4. A device of the character described, comprising a sleeve, a post operable in said sleeve, a pair of independent gripping jaws detachably carried by and interlocked to said post, a spreader between the upper or inner ends of said jaws to interlock said jaws to said post, a cam for advancing the lower or outer ends of said jaws into gripping engagement with a crown pin, and means for operating the post and jaws longitudinally of said sleeve.

5. A device of the character described, comprising a sleeve, a post operable in said sleeve, a pair of independent gripping jaws detachably carried by and interlocked to said post, said jaws having longitudinally disposed slots in the upper or inner ends thereof, a spreader adapted to enter said slots to interlock said jaws to said post, a cam for advancing the lower or outer ends of said jaws into gripping engagement with a crown pin; and means for operating the post and jaws longitudinally of said sleeve.

6. A device of the character described, comprising a supporting sleeve, a post longitudinally operable in said sleeve, a collar surrounding the end of said post within said sleeve, a pair of independent gripping jaws detachably secured to said post by said collar, means for expanding the upper or inner ends of said jaws to retain said ends within said collar, and means for advancing the lower or outer ends of said jaws toward each other, and means for operating said post and jaws longitudinally of said sleeve.

7. A device of the character described, comprising a supporting sleeve, a post longitudinally operable in said sleeve, a collar surrounding the end of said post within said sleeve, said collar being flanged at its lower end, a pair of independent gripping jaws provided with flanges at the upper or inner ends thereof adapted to seat upon the flange of said collar, a spreader attached to said post and adapted to separate the upper or inner ends of said gripping jaws to cause the flanges thereof to seat upon the flange of said collar and to hold the flanges of said jaws in engagement with the flange of said collar, and means for advancing the lower or outer ends of said jaws toward each other, and means for moving said jaws and post longitudinally of said sleeve.

8. A device of the character described, comprising a supporting sleeve, a screw threaded post longitudinally operable within said sleeve, a nut threaded upon said post exterior of said sleeve for operating said post longitudinally of said sleeve, a collar surrounding the end of said post within said sleeve and having an inturned flange at its free end, a pair of independent longitudinally slotted gripping jaws provided with out-turned flanges at the upper or inner ends thereof adapted to seat upon the inturned flange of said collar, a spreader secured to said post and adapted to enter the slots in said gripping jaws to expand the inner ends of said jaws to hold the flanges of said jaws in engagement with the flange of said collar, a retracting spring between said jaws, and a cam mounted upon said jaws for advancing the lower or outer ends of said jaws toward each other.

THOMAS W. ROSS.

In the presence of—
  E. B. LINN,
  A. J. McCAULEY.